United States Patent
Hu et al.

(10) Patent No.: US 12,475,250 B2
(45) Date of Patent: Nov. 18, 2025

(54) DATA PROTECTION METHOD AND APPARATUS, STORAGE MEDIUM, AND COMPUTER DEVICE

(71) Applicant: Huawei Technologies Co., Ltd., Shenzhen (CN)

(72) Inventors: Kekai Hu, Dongguan (CN); Igor Yurievich Korkin, Moscow (RU)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 186 days.

(21) Appl. No.: 18/319,841

(22) Filed: May 18, 2023

(65) Prior Publication Data

US 2023/0289465 A1   Sep. 14, 2023

Related U.S. Application Data

(63) Continuation of application No. PCT/CN2021/128481, filed on Nov. 3, 2021.

(30) Foreign Application Priority Data

Nov. 20, 2020   (RU) ............................ RU2020138023

(51) Int. Cl.
G06F 21/78    (2013.01)
G06F 21/53    (2013.01)
G06F 21/62    (2013.01)

(52) U.S. Cl.
CPC .......... *G06F 21/6227* (2013.01); *G06F 21/53* (2013.01); *G06F 21/78* (2013.01)

(58) Field of Classification Search
CPC ............ G06F 21/6281; G06F 21/6227; G06F 12/14–1491; G06F 21/78
See application file for complete search history.

(56) References Cited

U.S. PATENT DOCUMENTS 6,854,039 B1 *  2/2005  Strongin ............. G06F 12/1491
                                                          713/161
7,047,520 B2 *  5/2006  Moore ................. G06F 11/362
                                                          710/266

(Continued)

FOREIGN PATENT DOCUMENTS

CN    103020518 B      7/2015
CN    103270491 B  *  12/2016  ......... G06F 9/45558

(Continued)

OTHER PUBLICATIONS

"Data Breaches 101: How They Happen, What Gets Stolen, and Where It All Goes", Aug. 10, 2018, obtained online from <https://www.trendmicro.com/vinfo/us/security/news/cyber-attacks/data-breach-101>, retrieved on Apr. 5, 2025. (Year: 2018).*

(Continued)

*Primary Examiner* — Zhimei Zhu
(74) *Attorney, Agent, or Firm* — Conley Rose, P.C.

(57) ABSTRACT

A data protection method includes determining data that needs to be protected, and prohibiting direct access to the data that needs to be protected; if accessed data is the data that needs to be protected, triggering an interrupt to determine whether the access is abnormal; and restricting the access when the access is abnormal, or allowing the access when the access is normal.

20 Claims, 9 Drawing Sheets

(56) References Cited

U.S. PATENT DOCUMENTS

| | | | |
|---|---|---|---|
| 7,082,507 B1* | 7/2006 | Christie | G06F 12/145 |
| | | | 711/163 |
| 8,489,898 B2 | 7/2013 | Wong | |
| 8,578,483 B2 | 11/2013 | Seshadri et al. | |
| 8,943,288 B2 | 1/2015 | Heo et al. | |
| 9,639,698 B2 | 5/2017 | Yudin et al. | |
| 10,691,476 B2* | 6/2020 | Kapoor | G06Q 20/206 |
| 10,846,117 B1* | 11/2020 | Steinberg | G06F 21/56 |
| 11,244,044 B1* | 2/2022 | Malik | H04W 12/128 |
| 2002/0147916 A1* | 10/2002 | Strongin | G06F 21/79 |
| | | | 713/193 |
| 2012/0255003 A1 | 10/2012 | Sallam | |
| 2015/0331809 A1 | 11/2015 | Satyavolu et al. | |
| 2016/0179564 A1 | 6/2016 | Chen et al. | |
| 2016/0299720 A1* | 10/2016 | Berntsen | G06F 3/0659 |
| 2017/0262383 A1* | 9/2017 | Lee | G06F 12/1425 |
| 2017/0293754 A1* | 10/2017 | Jung | G06F 21/52 |

FOREIGN PATENT DOCUMENTS

| | | | | |
|---|---|---|---|---|
| CN | 106778243 A | | 5/2017 | |
| CN | 107066311 A | | 8/2017 | |
| CN | 110688650 A | * | 1/2020 | ............ G06F 21/52 |
| CN | 111177726 B | * | 2/2024 | ........... G06F 21/577 |
| EP | 2863316 A1 | * | 4/2015 | ............ G06F 13/24 |

OTHER PUBLICATIONS

Tian, D., et al, "A Policy-Centric Approach to Protecting OS Kernel from Vulnerable LKMs," Software-Practice and Experience, Softw. Pract. Exper. 2010; 00:1-18, www.interscience.wiley.com, DOI: 10.1002/spe, Feb. 23, 2018, 18 pages.

Historical Linux Kernel Runtime Guard (LKR) wiki [Openwall Community Wiki], Exploit detection examples, Detecting CVE-2014-9322 (BadIRET)-Fedora 20, https://openwall.info/wiki/p_lkrg/Main, 6 pages.

Reginato, L., "Updated Analysis of PatchGuard on Microsoft Windows 10 RS4, A use case of REVEN, the Timeless Analysis Tool," www.tetrane.com, Mar. 11, 2019, 61 pages.

* cited by examiner

DATA PROTECTION METHOD AND APPARATUS, STORAGE MEDIUM, AND COMPUTER DEVICE

CROSS-REFERENCE TO RELATED APPLICATIONS

This application is a continuation application of International Patent Application No. PCT/CN2021/128481, filed on Nov. 3, 2021, which claims priority to Russian Patent Application No. RU2020138023, filed on Nov. 20, 2020. The disclosures of the aforementioned applications are hereby incorporated by reference in their entireties.

TECHNICAL FIELD

This application relates to the computer field, and in particular, to a data protection method and apparatus, a storage medium, and a computer device.

BACKGROUND

An operating system (OS) implements permission isolation for multitask processing via two execution modes: a user mode (for example, a common user mode of WINDOWS) and a kernel mode (for example, an administrator user mode of WINDOWS). Code running in the kernel mode has a higher permission and can access a kernel memory area in a system memory, while code running in the user mode has many restrictions, can access only a user memory area in the system memory, but cannot access the kernel memory area. Such a difference in the code execution modes helps isolate user code from kernel code, protecting the kernel memory area. However, the kernel code in the kernel mode is often a target of hackers because of the higher permission of the kernel code.

The kernel code running in the kernel mode has unrestricted read/write access permissions to any part of the kernel memory area of the OS. General memory protection is inadequate for abnormal access to the kernel memory area.

SUMMARY

This application discloses a data protection method and apparatus, a storage medium, and a computer device, to effectively avoid data tampering and theft in an OS by determining whether access to data that needs to be protected is abnormal and further restricting abnormal access, thereby protecting data security in the OS.

According to a first aspect, this application provides a data protection method. The method includes: determining data that needs to be protected, and prohibiting direct access to the data that needs to be protected; if accessed data is the data that needs to be protected, triggering an interrupt to determine whether the access is abnormal; and restricting the access when the access is abnormal.

By determining whether the access to the data that needs to be protected is abnormal and restricting abnormal access, data tampering and theft in an OS can be effectively avoided, thereby protecting data security in the OS.

In a feasible implementation, the determining whether the access is abnormal includes: checking whether a source and/or a destination of the access are/is abnormal.

In a feasible implementation, the method further includes: separating a storage block of the data that needs to be protected from a storage block of data that does not need to be protected, so that only the protected data exists in at least one storage block, or only the data that does not need to be protected exists in at least one storage block. According to this solution, it is avoided that the data that needs to be protected and the data that does not need to be protected are mixed in one storage block, causing an increase in a quantity of times of determining and processing that needs to be performed. Only a storage area in which the data that needs to be protected is stored may be determined, interrupted, and processed, thereby improving efficiency of determining and processing.

In a feasible implementation, the method further includes: setting a flag bit for a page table entry of a storage block of each piece of data, to indicate whether corresponding data is the data that needs to be protected. By merely determining a value of the flag bit, it can be quickly determined whether an accessed object is the data that needs to be protected, to improve processing efficiency.

In a feasible implementation, the method further includes: updating a list of the data that needs to be protected. It can be ensured that, by updating the list, the list is real-time and the data that needs to be protected is identified and protected in time.

In a feasible implementation, the updating a list of the data that needs to be protected includes: updating the list based on a real-time event of the OS.

In a feasible implementation, the triggering an interrupt to determine whether the access is abnormal includes: determining, from an interrupt descriptor table based on the interrupt, an interrupt handler to be run.

In a feasible implementation, the method further includes: setting a watchdog to prevent a status of any one or more of the list, the interrupt descriptor table, and the flag bit from being tampered with. The watchdog can protect each component in this application from being tampered with by attackers in real time, to reduce a possibility that a protection mechanism is bypassed.

In a feasible implementation, the determining data that needs to be protected includes: determining, based on a type and/or a function of existing attacked data, the data that needs to be protected.

In a feasible implementation, the method further includes: determining a frequency for accessing the data that needs to be protected, and when the frequency is greater than or equal to a threshold, canceling protection for the data that needs to be protected. When the frequency for accessing is high, a quantity of times that the accessed data is checked increases, and a probability of the accessed data being attacked and tampered with is low. To improve protection efficiency, when the data that needs to be protected is accessed frequently, the data is deleted from the list.

According to a second aspect, this application provides a data protection apparatus. The apparatus includes a determining module, a processing module, a storage module, and a classification module.

The classification module is configured to determine, from data stored in the storage module, data that needs to be protected.

The determining module is configured to prohibit direct access to the data that needs to be protected, and trigger an interrupt if accessed data is the data that needs to be protected.

The processing module is configured to determine whether the access is abnormal, and when the access is abnormal, restrict the access.

By determining whether the access to the data that needs to be protected is abnormal and restricting abnormal access, data tampering and theft in an OS can be effectively avoided, thereby protecting data security in the OS.

In a feasible implementation, that the processing module is configured to determine whether access is abnormal includes: checking whether a source and/or a destination of the access are/is abnormal.

In a feasible implementation, the classification module is further configured to separate an area for storing the data that needs to be protected from an area for storing data that does not need to be protected, so that only the data that needs to be protected or the data that does not need to be protected exists in at least one storage block. According to this solution, it is avoided that the data that needs to be protected and the data that does not need to be protected are mixed in one storage block, causing an increase in a quantity of times of determining and processing that needs to be performed. Only a storage area in which the data that needs to be protected is stored may be determined, interrupted, and processed, thereby improving efficiency of determining and processing.

In a feasible implementation, the apparatus further includes an updating module. The updating module is configured to set a flag bit for a page table entry in a storage block of each piece of data, to indicate whether corresponding data is the data that needs to be protected. By merely determining a value of the flag bit, it can be quickly determined whether an accessed object is the data that needs to be protected, to improve processing efficiency.

In a feasible implementation, the updating module is further configured to update a list of the data that needs to be protected. It can be ensured that, by updating the list, the list is real-time and the data that needs to be protected is identified and protected in time.

In a feasible implementation, that the updating module is further configured to update a list of the data that needs to be protected includes: The updating module updates the list based on a real-time event of the OS.

In a feasible implementation, that the processing module is configured to determine whether the access is abnormal includes: The processing module determines, from an interrupt descriptor table based on the interrupt, an interrupt handler to be run.

In a feasible implementation, the apparatus further includes a monitoring module. The monitoring module is configured to prevent a status of any one or more of the list, the interrupt descriptor table, and the flag bit from being tampered with. The monitoring module can protect each component in this application from being tampered with by attackers in real time, to reduce a possibility that a protection mechanism is bypassed.

In a feasible implementation, that the classification module is configured to determine, from data stored in the storage module, data that needs to be protected includes: The classification module is configured to determine, based on a type and/or a function of existing attacked data, the data that needs to be protected.

In a feasible implementation, the updating module is further configured to determine a frequency for accessing the data that needs to be protected, and when the frequency is greater than or equal to a threshold, the determining module cancels protection for the data that needs to be protected. When the frequency for accessing is high, a quantity of times that the accessed data is checked increases, and a probability of the accessed data being attacked and tampered with is low. To improve protection efficiency, when the data that needs to be protected is accessed frequently, the data is deleted from the list.

According to a third aspect, a computer-readable storage medium is provided. The computer-readable storage medium stores computer instructions. When the computer instructions in the computer-readable storage medium are executed by a computer device, the computer device is enabled to perform the method in any feasible implementation of the first aspect.

According to a fourth aspect, a computer device is provided. The computer device includes a processor and a memory.

The memory stores computer instructions.

The processor executes the computer instructions, so that the computer device performs the method in any feasible implementation of the first aspect.

BRIEF DESCRIPTION OF DRAWINGS

To describe the technical method in embodiments of this application more clearly, the following describes the accompanying drawings for describing the embodiments.

DESCRIPTION OF EMBODIMENTS

Figure 1:
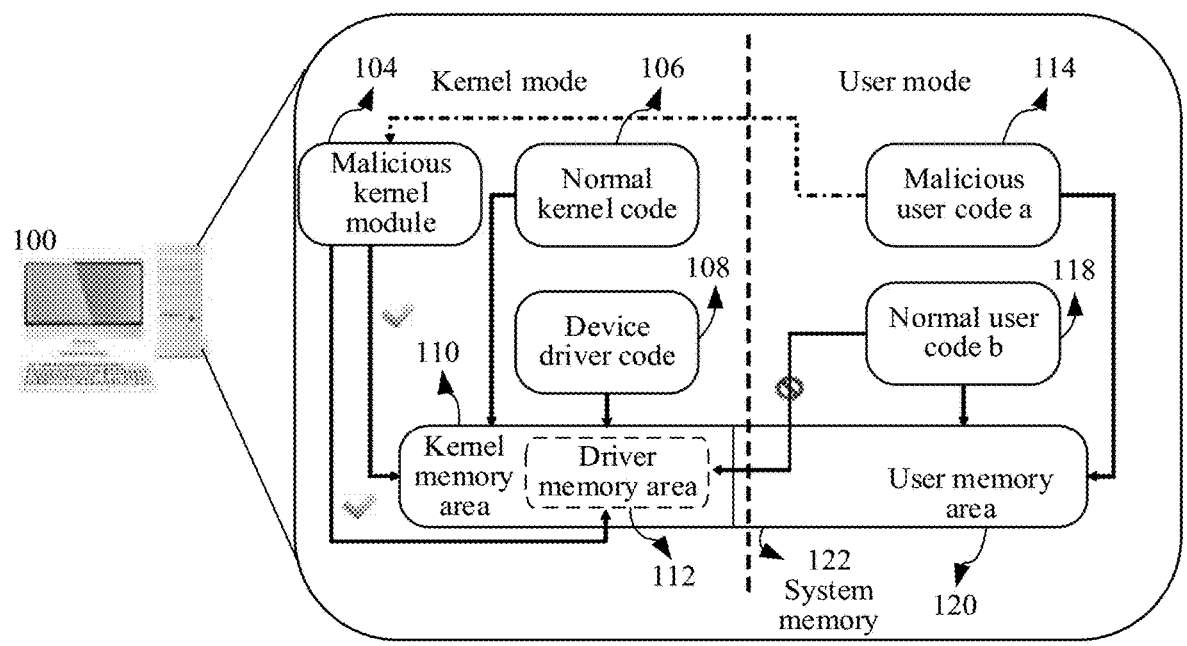
FIG. 1 is a schematic diagram of a structure of an OS having malicious kernel code.

A computer 100 in FIG. 1 is used as an example. The computer 100 includes normal kernel code 106, device driver code 108, malicious user code a 114, normal user code b 118, and a system memory 122. According to different permission levels and/or security requirements, the system memory 122 is divided into two areas. One area is a kernel memory area 110 that can be accessed only by code in a kernel mode, and includes a driver memory area 112. The other area is a user memory area 120 that can be accessed by user code in a user mode.

The user code cannot access the kernel memory area. For example, the normal user program b 118 cannot access the kernel memory area 110, and cannot perform read/write operations on data in the kernel memory area 110. Code that runs in the kernel mode, such as the normal kernel code 106 and the device driver code 108, has a high permission and may directly access the entire system memory 122 including the kernel memory area 110 and the user memory area 120. Direct access herein refers to accessing data in the kernel memory area without performing determining or confirmation.

However, a high permission in the kernel mode has been a main target of hackers. Common attacks include injecting malicious kernel code by escalating a permission of malicious user code in the user mode through privilege escalation vulnerabilities or other related vulnerabilities. When the malicious kernel code is injected into a system, the code has a same permission as the normal kernel code. Data in the kernel memory area may be tampered with and data theft may occur, and malicious code such as a Trojan horse and a backdoor may be further injected.

For example, in FIG. 1, the malicious user code a 114 is injected with malicious kernel code 104 by exploiting a vulnerability of an OS. The malicious kernel code 104 has a permission to access the kernel memory area 110, and can perform read/write operations on sensitive-data in the kernel memory area 110. Further, the malicious user code a 114 also has a permission to access the kernel memory area 110.

Figure 2:
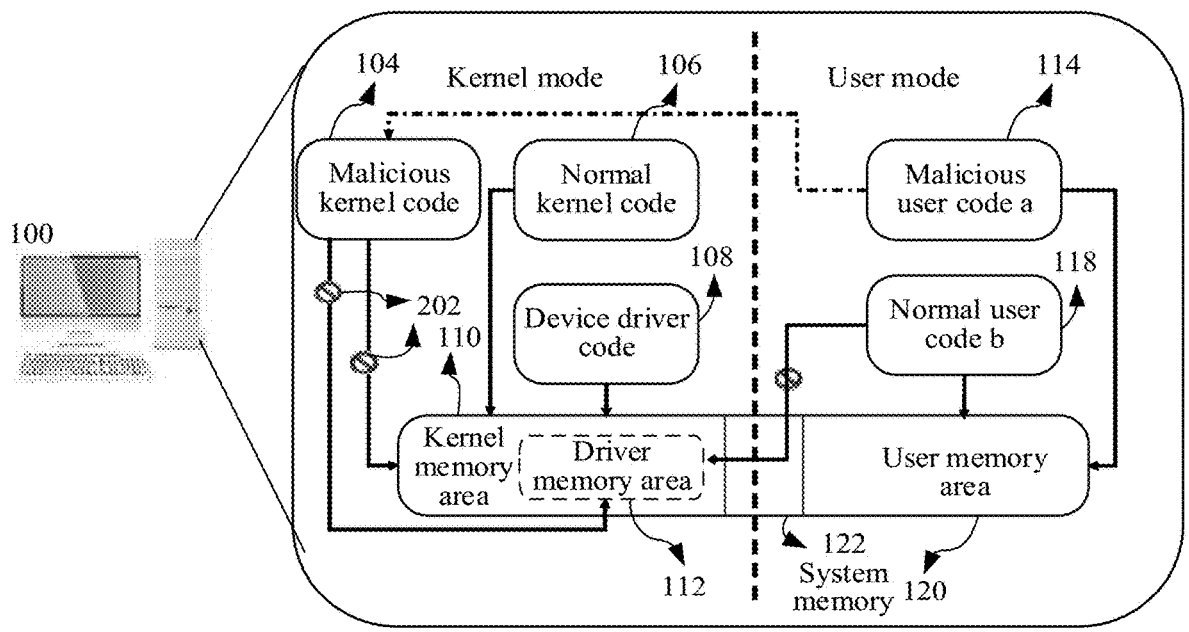
FIG. 2 is a schematic diagram of a structure of an OS having malicious kernel code according to an embodiment of this application.

Embodiments of this application provide technical solutions for protecting the kernel memory area by using an access mechanism of a memory system. As shown in FIG. 2, protection against access to the kernel memory area 110 by the malicious kernel code 104 is performed, and whether the access is abnormal is determined. If the access is abnormal, the access is restricted. It should be noted herein that the driver memory area 112 may belong to the kernel memory area 110, or may not belong to the kernel memory area 110.

In an OS that uses a virtual memory, a page table is a data structure used to store a mapping relationship between a virtual address (linear address, also referred to as a logical address) and a physical address. Memory space is divided and managed by using memory pages as units. The page table uses the virtual address to enable each piece of computer code to consider that each piece of computer code obtains a large and continuous memory space. Physically, an actual physical memory of each piece of computer code may be scattered in different areas of physical memory space, or data accessed by the computer code may have been moved to another memory, typically a hard disk.

Figure 3:
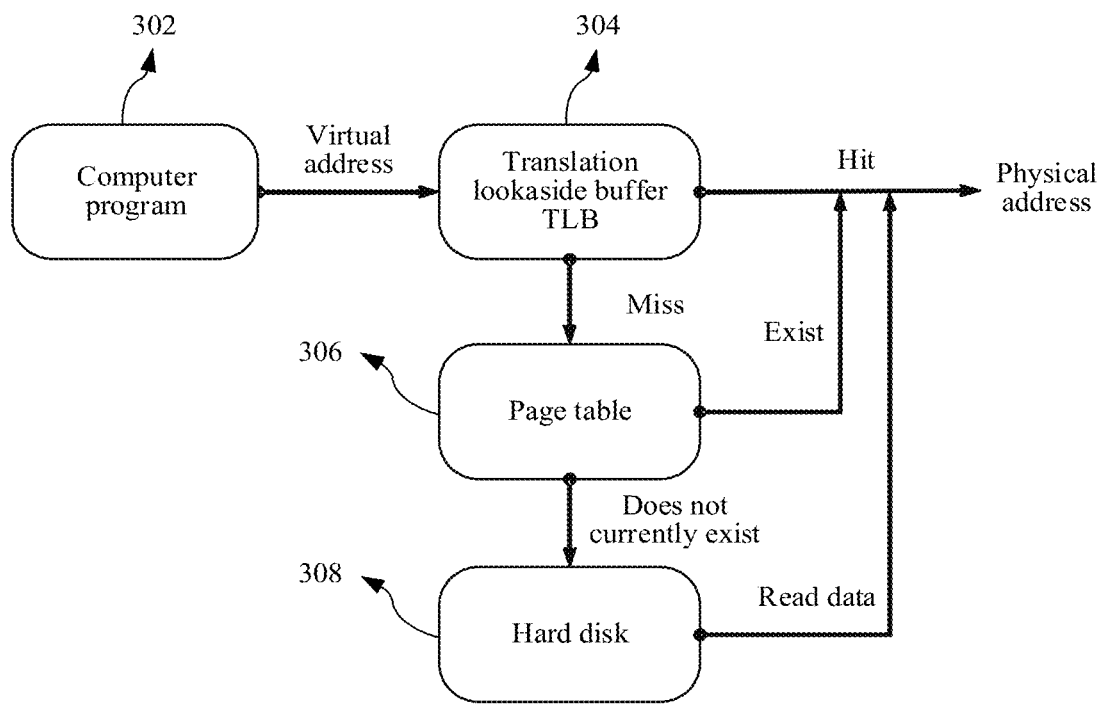
FIG. 3 is a schematic diagram of a structure of page table access.

To improve performance of the page table, a memory management unit (MMU) of a CPU stores a recently used page table entry as a cache, which is referred to as a translation lookaside buffer (TLB). FIG. 3 shows a relative position of and a logical relationship between the TLB and the page table in a system memory structure. FIG. 3 includes computer code 302, a TLB 304, a page table 306, and a hard disk 308.

When a virtual address is translated to a physical address, the TLB 304 is searched first. If a match is found, in other words, a TLB is hit, the physical address is returned to, and memory access may continue to be performed. However, if there is no match, in other words, the TLB is missed, the MMU or the TLB is missed. A corresponding page table entry is usually looked up in the page table. If the corresponding page table entry exists, the page table is written back to the TLB. If no corresponding valid page table entry exists in the page table, a page fault (PF) is triggered. The processor finds a corresponding interrupt handler via an interrupt descriptor table (IDT), and performs a further operation, for example, reads data from a hard disk and updates the page table entry in the page table.

As one of core data structures of a modern OS, the page table implements page-level security control and protection technologies, for example, distinguishes between permissions in a user mode and a kernel mode, and controls memory read/write permissions, such as readable, runnable, unwritable, supervisor mode execution protection (SMEP), and supervisor mode access protection (SMAP) operations.

In an existing page table solution, the OS does not distinguish between memory areas accessed by code at a same permission level, for example, kernel code, device driver code, and kernel code of the OS that are in the kernel mode, and does not perform further distinguishing and fine-grained management on an accessed area of memory space.

As a result, malicious device driver code and malicious kernel code have a same permission as the normal kernel code to access a kernel memory area. Some memory pages of sensitive-data and memory pages of insensitive-data are not distinguished, and the sensitive-data and the insensitive-data may exist in one memory page. The sensitive-data can be accessed as long as the malicious kernel code accesses the page table. Intruders may inject the malicious driver code and the malicious kernel code to locate and modify data in the kernel memory area, steal the sensitive-data, and install permanent and undetectable Trojan horses and backdoors on a victimized computer system.

Figure 4:
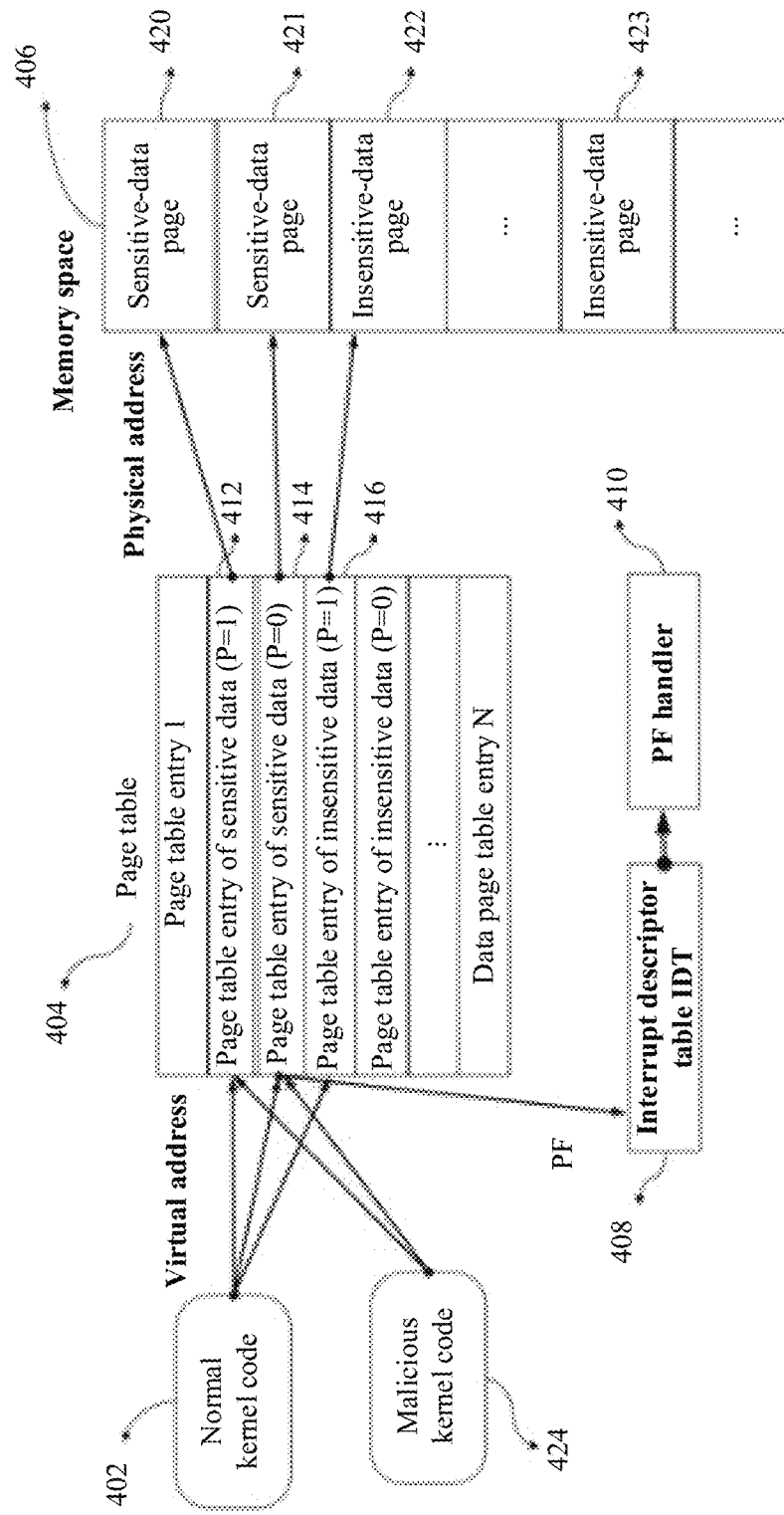
FIG. 4 is a schematic diagram of a data classification scheme according to an embodiment of this application.

Embodiments of this application provide a feasible technical solution. As shown in FIG. 4, a page table 404 stores at least one page table entry, and the page table entry stores a mapping relationship between a memory virtual address and a physical address. When normal kernel code 402 needs to access data in memory space 406, the normal kernel code 402 first finds a corresponding page table entry such as a page table entry 412 in the page table 404 based on the virtual address, then finds a physical address corresponding to a memory based on a mapping relationship in the page table entry 412, and finally accesses a memory page 422 in the memory space 406 and performs read/write operations on the data stored in the memory space 406. In the memory space, areas in which the sensitive-data and the insensitive-data are stored are distinguished. For example, in this embodiment, memory pages 420 and 421 store only the sensitive-data, and memory pages 422 and 423 store only the insensitive-data. No memory page stores both the sensitive-data and the insensitive-data. A reason for this is that, at a granularity of a memory page, access to a specific memory page is controlled for protection and restriction, to protect data stored in the memory page.

A page table entry corresponding to a memory page that stores sensitive-data is a page table entry of sensitive-data. A page table entry corresponding to a memory page that stores insensitive-data is referred to as a page table entry of insensitive-data.

The following describes how to control access to a specific memory page for protection and restriction. With the development of an OS, more flag bits are added to the page table to provide auxiliary information for each page table entry and indicate some statuses of corresponding memory pages. Some of these flag bits are dedicatedly designed for system security, for example, distinguishing between a user mode and a kernel mode. Some of these flag bits are designed for system function and performance, for example, a present bit Present, also referred to as a P bit, indicating whether a memory page exists in memory space, and an ACCESSED flag indicating whether the memory page can be accessed. During page table traversal, if an operation on the memory page conflicts with information about these flag bits, an abnormal interrupt is triggered.

As shown in FIG. 4, the present bit P is used as an example. When a page table entry 414 is traversed, it is determined that a value of the flag bit P is 0, indicating that data on a memory page 421 corresponding to the page table entry 414 is not in the memory space 406. Alternatively, data in the memory page 421 is not valid. In this case, a PF is triggered. A corresponding interrupt handler is found by querying for an interrupt descriptor table 408 for further processing, for example, data that needs to be accessed is read from a hard disk, and a corresponding page table entry is refreshed.

When a page table entry 416 is traversed, it is determined that the value of the flag bit P is 1, indicating that data in the memory page 422 corresponding to the page table entry is in the memory space 406. Based on a mapping relationship between the virtual address and the physical address stored in the page table entry 416, data in the memory page 422 may be directly accessed, and read/write operations may be performed on the data.

However, after malicious kernel code is injected, malicious kernel code 424 can also access the page table entry 412 of the sensitive-data. When the value of the flag bit P is 1, based on the mapping relationship between the virtual address and the physical address in the page table entry, the malicious kernel code 424 can access and perform read/write operations on sensitive-data in a sensitive-data page 420 in the memory space 406. Therefore, a protection measure is required, to monitor a memory page of sensitive-data that needs to be protected and restrict access to the sensitive-data that needs to be protected.

However, there is a large amount of memory space in the kernel mode of the OS, so that it is not realistic to perform equal real-time security monitoring on all memory space. Therefore, as described above, key sensitive-data needs to be found, to distinguish between the sensitive-data and the insensitive-data. One memory page stores only the sensitive-data. It is very important to manage and protect such sensitive-data pages in a unified manner. To achieve this objective, in this embodiment of this application, an existing interrupt mechanism in the page table is used. Any access operation on a sensitive-data page triggers an interrupt, and then a new interrupt handler designed in the technical solution of this embodiment is entered.

Figure 5:
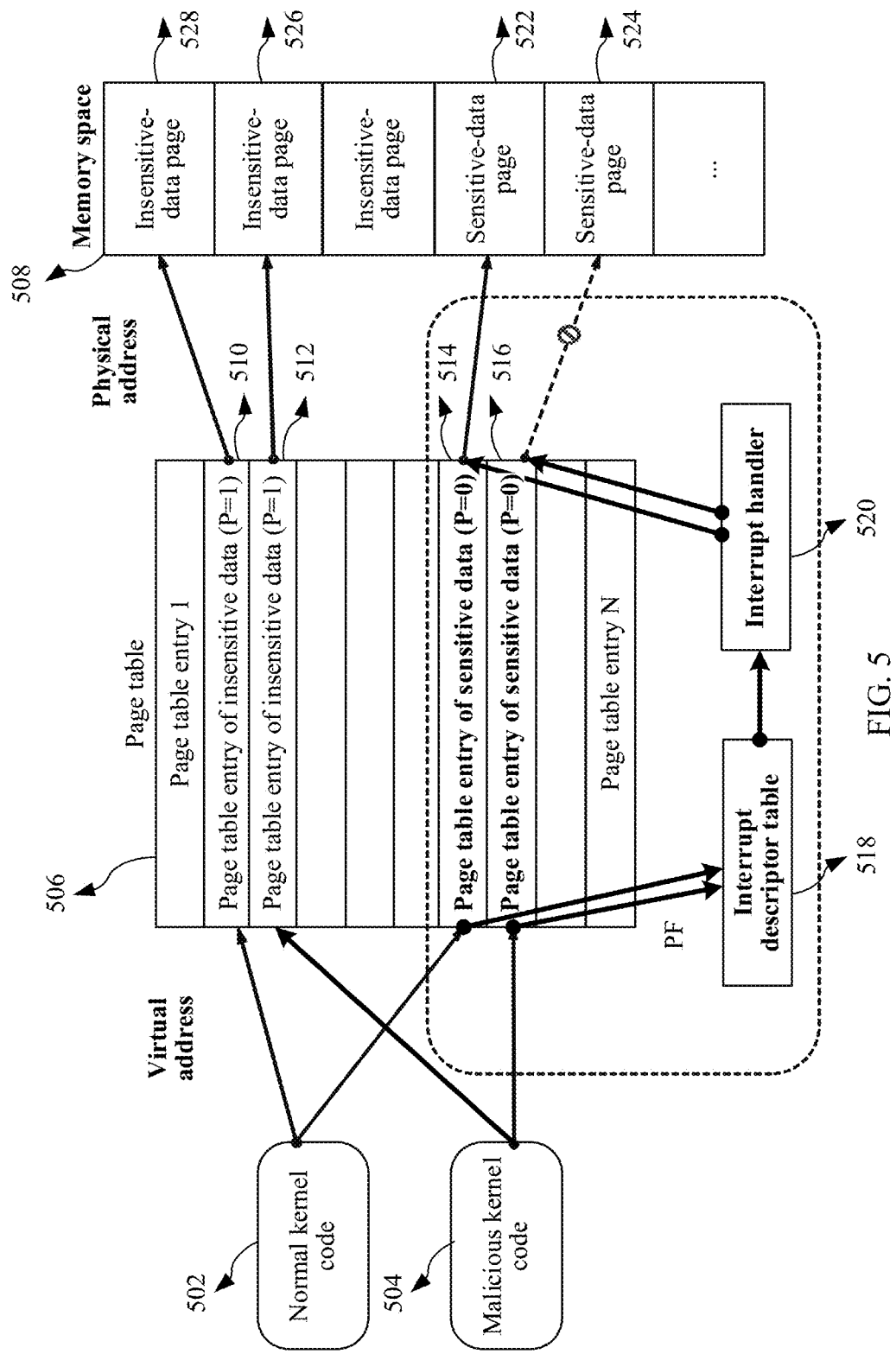
FIG. 5 is a schematic diagram of a sensitive-data protection scheme according to an embodiment of this application.

An embodiment of this application provides a technical solution. As shown in FIG. 5, sensitive-data and insensitive-data are distinguished. For example, memory pages 528 and 526 corresponding to a page table entry 510 and a page table entry 512 store the insensitive-data. Memory pages 522 and 524 corresponding to a page table entry 514 and a page table entry 516 store the sensitive-data. Page table entries corresponding to all sensitive-data pages are marked by using a flag bit, for example, a P bit. A value of the P flag bit of the page table entries corresponding to all the sensitive-data pages is set to 0. This means that as long as there is a page table entry that accesses the sensitive-data, an interrupt is inevitably triggered. For example, when accessing a sensitive-data page 524, malicious kernel code 504 needs to first access the page table entry 516 of the sensitive-data in a page table 506. If the value of the P bit of the page table entry 516 is 0, the interrupt is inevitably triggered. After the interrupt is triggered, an interrupt descriptor table 518 is searched for a corresponding interrupt handler 520 to protect the page the table entry of the sensitive-data. The interrupt handler 520 determines whether the access is normal. When determining that the access is abnormal, the interrupt handler 520 prohibits the malicious kernel code 504 from accessing the sensitive-data page 524. In addition, an alarm is generated for the abnormal access, indicating that an abnormal access operation occurs. The indication may be used to further determine whether the malicious kernel code 504 exists in a system, to clear the malicious kernel code 504.

When the access is normal, for example, normal kernel code 502 accesses the sensitive-data page 522, the page table entry 514 of a sensitive-data page needs to be first accessed. Because the value of the P bit is 0, the interrupt is still triggered, and the interrupt descriptor table 518 is searched for a corresponding interrupt handler. The interrupt handler 520 determines whether the access is normal. When determining that the access is normal, the interrupt handler 520 allows the access to the sensitive-data page 522, to complete access of the normal kernel code 502 to the sensitive-data page 522. The interrupt handler 520 may be a PF handler, or may be an interrupt handler corresponding to another flag bit. This is not limited in this application. It can be learned from here that an advantage of concentrating the sensitive-data in some memory pages and concentrating insensitive-data in some other memory pages is to avoid triggering the interrupt as long as one memory page has some sensitive-data, so that excessive consumption of OS performance can be avoided. In this way, a balance is achieved between system performance consumption and OS security.

When the page table entry 512 and the page table entry 510 of the insensitive-data are accessed, if the value of the P bit is 1, no interrupt is triggered. A mapping relationship may be directly obtained from the page table entry, so that an insensitive-data page is accessed, and read/write operations are performed on the insensitive-data page. When the value of the P bit of the page table entry of the insensitive-data is 0, the PF interrupt is triggered. The interrupt handler determines that an accessed object is the insensitive-data. Therefore, the access is not restricted.

It is easily understood that, in this embodiment of this application, the flag bit may be an existing flag bit, such as the foregoing flag bit P, or may be another existing flag bit, or may be a new flag bit. Corresponding interrupts may be used for flag bits in different cases. In addition, the interrupt descriptor table is refreshed to trigger a correct interrupt handler and determine whether access to the sensitive-data page is normal.

It should be further noted that, in another embodiment, the sensitive-data may be protected by using another technical solution. For example, whether data is the sensitive-data is determined by determining an attribute or permission of the data.

Determining whether the access is normal may be determining whether an access source is normal, for example, whether the access source is from kernel code that has undergone security verification, or whether the access source is from kernel code whose access permission has been confirmed. In addition, determining whether the access is normal may be determining whether an access purpose is normal. For example, whether the access modifies some security settings, disables some security mechanisms, or the like. In a feasible implementation, if both the access source and the access purpose are normal, it may be determined that the access is normal.

Figure 6:
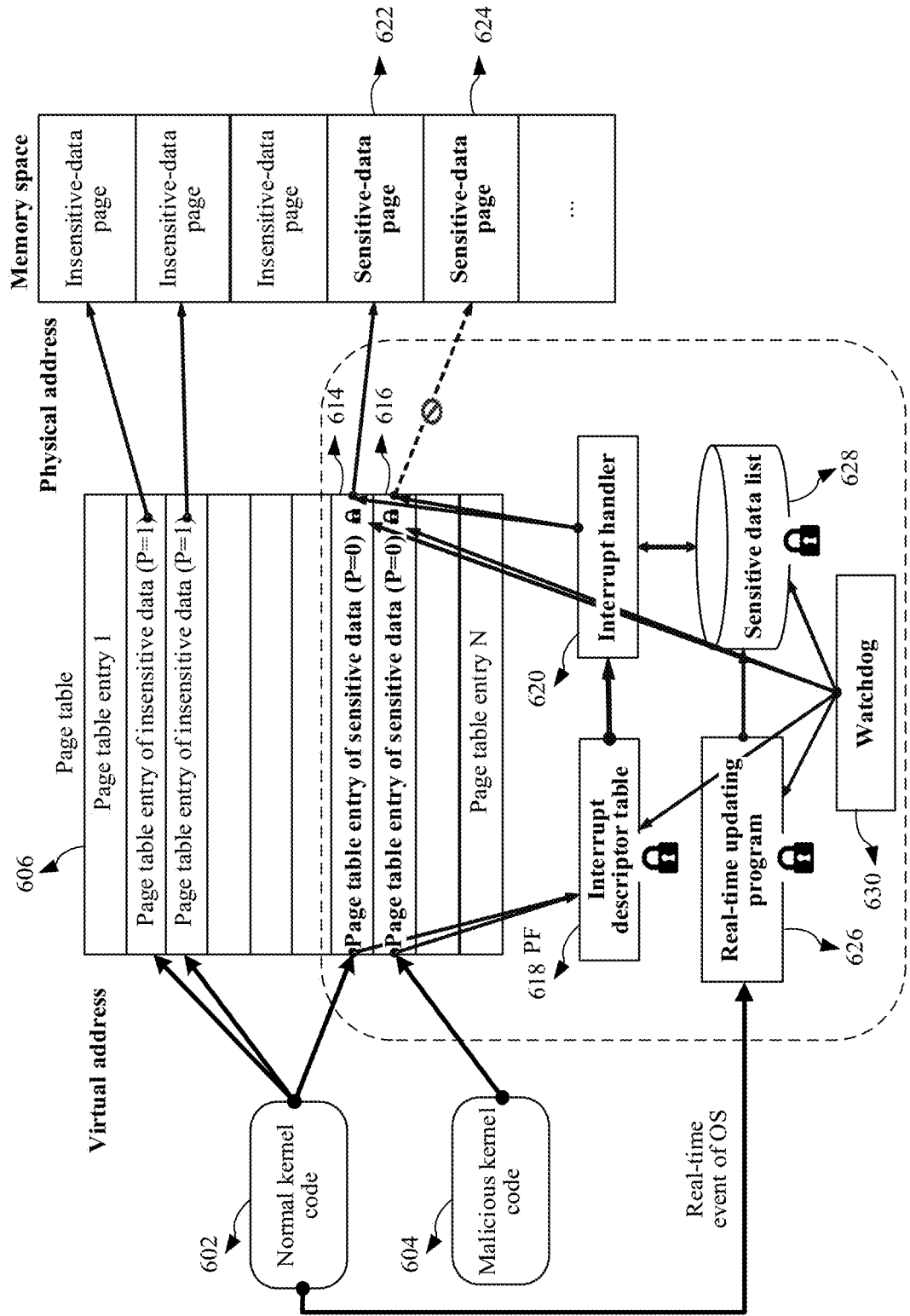
FIG. 6 is a schematic diagram of another sensitive-data protection scheme according to an embodiment of this application.

To ensure real-time availability and high reliability of the technical solution provided in this embodiment of this application, as shown in FIG. 6, a real-time updating program 626 and a sensitive-data list 628 are added, a real-time event of an OS is obtained from normal kernel code 602, and the sensitive-data list 628 is synchronized and updated in real time based on the real-time event of the OS, where for example, one memory space area is created and/or removed and one piece of kernel code is loaded and/or unloaded, or based on a latest attack manner and a data type of a latest attack included in a system patch update, so that the sensitive-data list 628 always includes information about the latest sensitive-data and is not bypassed by malicious kernel code 604 although the sensitive-data list 628 is outdated, and an abnormal access to a sensitive-data page and read/write operations cannot be performed. The normal kernel code 602 includes OS kernel code, driver code, and the like. The real-time event of the OS can When the malicious kernel code 604 attempts to access a sensitive-data page 624, the malicious kernel code 604 first accesses a page table entry 616 of sensitive-data, and triggers a PF interrupt after determining that a flag bit P=0, to find a corresponding interrupt handler 620 from an interrupt descriptor table 618. The interrupt handler 620 performs comparison in a sensitive-data list, determines that a target memory page to be accessed is the sensitive-data page, and triggers the interrupt handler 620 to determine whether the access is abnormal. When finding that the access is abnormal, the interrupt handler 620 rejects access of the malicious kernel code 604.

Further, to ensure that a protection mechanism is not tampered with or bypassed by attackers, a watchdog 630 is further added in this embodiment of this application to detect key components. The key components that are mainly detected include a page table entry of the sensitive-data (for example, a page table entry 614 and the page table entry 616 of the sensitive-data) and an auxiliary flag bit thereof (for example, the flag bit P), the interrupt descriptor table 618, the real-time updating program 626, the sensitive-data list 628, and the like. The watchdog 630 periodically performs verification on the key component. If the verification succeeds, it indicates that the key component is not tampered with. If the verification fails, it indicates that the key component is tampered with. If the key component is tampered with, an alarm is generated, prompting a user to check a device.

It should be noted that the watchdog 630 mentioned in this embodiment of this application may be a watchdog in a software form, or may be a watchdog in a hardware form. This is not limited in this application.

In another embodiment of this application, a dedicated flag bit is added to a page table entry, to indicate whether data stored in a memory page corresponding to the page table entry is the sensitive-data or insensitive-data. For example, 1 indicates that the sensitive-data is stored in a corresponding memory page, and 0 indicates that the insensitive-data is stored in a corresponding memory page. A value of the flag bit is not limited in this embodiment of this application. In this case, the real-time updating program refreshes and maintains the dedicated flag bit based on real-time data of the OS. When the sensitive-data page is accessed, an interrupt is triggered based on the flag bit. The interrupt handler directly determines whether the access is abnormal. If the access is abnormal, the access is restricted. If the access is normal, the access is allowed. It can be seen that, in the technical solution provided in this embodiment, the sensitive-data list is no longer required.

This embodiment of this application includes two main phases. A first phase is an initialization phase, and a second phase is a real-time running phase. The initialization phase is mainly responsible for necessary configuration and update of each component, and is generally completed when the OS is started. The real-time running phase is activated when the sensitive-data is accessed or the real-time event of the OS occurs. The real-time running phase is mainly responsible for determining whether a data access is abnormal, responding to update of the sensitive-data list, triggering the watchdog to generate an alarm, and the like.

Figure 7:
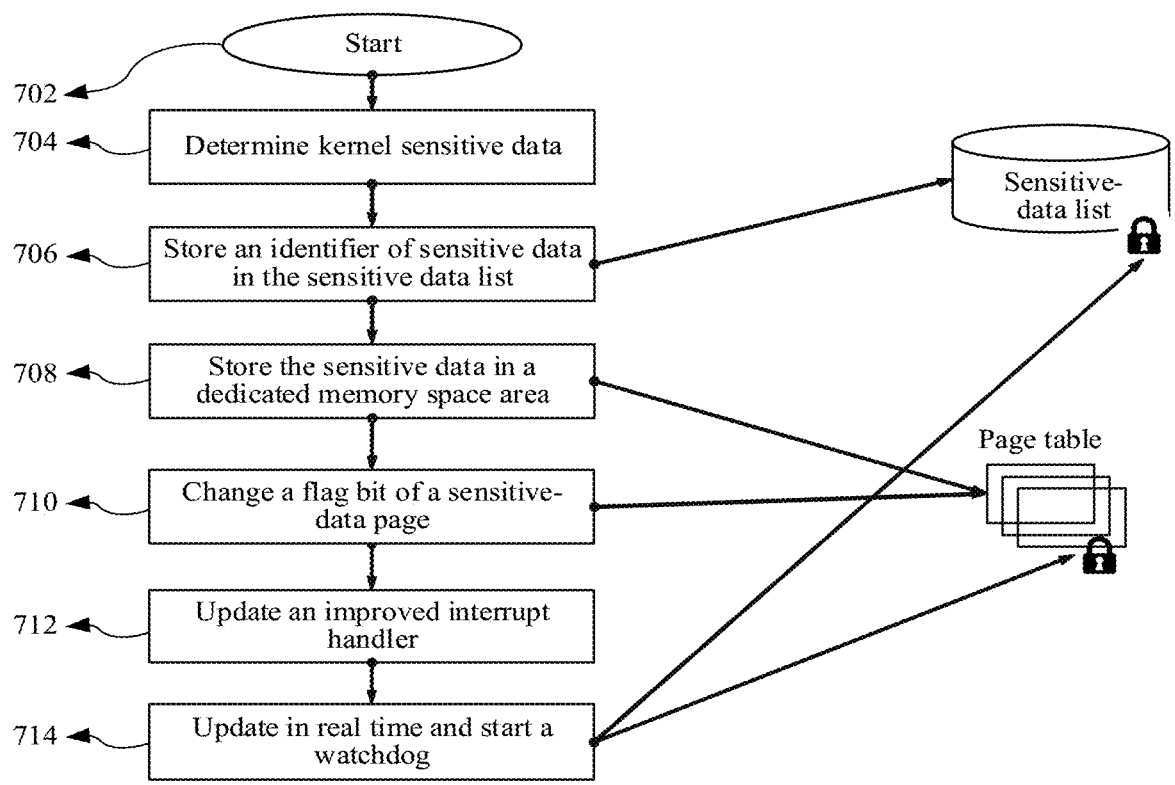
FIG. 7 is a schematic flowchart of a sensitive-data protection scheme according to an embodiment of this application.

FIG. 7 is a flowchart of an initialization phase of an OS. After the OS is started, the following steps are performed to initialize the OS.

Procedure 702: Start initializing the OS.

Procedure 704: Determine kernel sensitive-data. This procedure can be completed in two manners. A first manner is based on current data with high kernel attack frequency. A second manner is to identify sensitive-data based on a type, definition, usage, and/or function of the data. In addition, it is also important to determine a frequency for accessing the data. A lower frequency of accessing the data indicates fewer performance overheads in this embodiment. When a frequency for accessing is higher, if the data is protected as the kernel sensitive-data, the performance overheads are higher. Therefore, when the frequency for accessing is greater than or equal to a threshold, the data can be removed from a protected object. This avoids excessive performance overheads. In addition, frequently accessed data, even if tampered with and attacked by malicious kernel code, is easy to be identified due to being used and checked frequently. Such data is less likely to be attacked.

Common sensitive-data includes security-related configuration and status flags, such as data of "selinux_enforcing" and "selinux_enabled" in Security-Enhanced Linux (SELinux), kernel code that has been loaded into a memory, kernel handles frequently used by hackers, and the like.

It should be noted that sensitive information to be protected varies in different OSs. The sensitive information is selected and configured depending on specific OSs. Even in the same OS, the sensitive information is mutable and needs to be updated and expanded based on latest attacks on a kernel memory of the OS. These latest attack manners may be obtained by updating patches of the OS, or may be downloaded from the Internet, or may be uploaded to the OS by using a storage medium. An obtaining manner is not limited herein. It is easily understood that the obtaining manner shall fall within the protection scope of this application.

Procedure 706: Store an identifier of the sensitive-data in a sensitive-data list. A subsequent interrupt handler may identify, based on the list, whether an accessed object is the sensitive-data. A real-time updating program also updates the list in real time based on a real-time event of the OS. The identifier may be a name of the sensitive-data, a page table entry, a serial number of a page table entry, or another identifier that may represent the sensitive-data.

Procedure 708: Store the sensitive-data in a dedicated memory space area. Based on a size of the sensitive-data, memory pages of 4 KB, 2 MB, and 4 MB may be used to store identified sensitive-data. The sensitive-data is identified in the memory space to exclude a case that the sensitive-data and insensitive-data are located on the same memory page. Monitoring is performed at a granularity of a page table entry. Therefore, as long as a memory page has sensitive-data, a corresponding page table entry needs to be monitored. If the page table entry is monitored, it means that an interrupt is triggered each time the page table entry is accessed. If the sensitive-data is scattered across all memory pages, each access to each page table entry is interrupted. This greatly affects performance of the OS. Therefore, a memory page for storing the sensitive-data is distinguished from a memory page for storing the insensitive-data. The sensitive-data is centrally stored, and the interrupt may not be triggered when a page table entry corresponding to the insensitive-data is accessed, thereby reducing performance loss of the OS caused by the monitoring and the interrupt. This can help modify corresponding kernel code of the OS.

Procedure 710: Change a flag bit of a sensitive-data page. Access restrictions may be configured for different scenarios and for trade-offs between performance and security. For example, the access restrictions may include either a read restriction or a write restriction, or include read/write restrictions. Fewer restrictions are better for performance, and more restrictions indicate more security but have greater impact on performance. In this embodiment, a present bit P is used as a control and is used to trigger a page fault interrupt PF to go to a corresponding interrupt handler. As described above, the flag bit P may be used to identify a page table entry of the sensitive-data and a page table entry of the insensitive-data, or another flag bit may be used to implement this function. Details are not described herein again.

Procedure 712: Update an improved interrupt handler. The improved interrupt handler may be installed in a plurality of manners, for example, by overwriting an address in an interrupt descriptor table to point to a new interrupt handler, or by overwriting an existing interrupt handler. This may help capture all page fault interrupts PFs or other interrupts with the same function described in embodiments of this application, go to the interrupt handler, and implement an operation of protecting the sensitive-data in the memory.

Procedure 714: Start the real-time updating program and start a watchdog. The real-time updating program monitors creation and release of the sensitive-data. Once a change is detected, a flag bit of a page table entry of the sensitive-data and the sensitive-data list are updated accordingly.

The watchdog is mainly responsible for preventing attackers from disabling and bypassing a protection mechanism of memory-sensitive-data in embodiments of this application, and preventing the real-time updating program, the sensitive-data list, the interrupt descriptor table, the flag bit of the page table entry, and the like from being tampered with.

For example, malware may allow the malicious kernel code 604 to access sensitive-data in a memory-sensitive-data page 622 by intentionally modifying an access control flag bit in a corresponding page table entry, where for example, the P bit of the page table entry 614 in FIG. 6 is set to 1. To prevent such attacks, the watchdog cyclically monitors integrity of the access control flag bit.

After initialization is complete, the OS enters a normal operation. When the following three events are triggered, the technical solutions mentioned in embodiments of this application are invoked to respond. The three events include: The sensitive-data is accessed; the real-time event of the OS changes the sensitive-data list; and the watchdog is triggered. The following describes the three events separately.

When protected sensitive-data is accessed, the page fault interrupt PF is triggered because a corresponding page table entry of the protected sensitive-data is identified as invalid by the flag bit P, and then the interrupt handler runs. It should be noted that, because an existing P bit is reused in this embodiment of this application, when normal insensitive-data does not currently exist in a page table, the page fault interrupt is also triggered. Therefore, the improved interrupt handler needs to process the page fault interrupt based on procedures shown in FIG. 8. The following provides detailed descriptions.

When an interrupt is triggered, the interrupt handler first determines whether the interrupt is a normal interrupt of the insensitive-data or the sensitive-data is accessed. If the interrupt is a normal interrupt, normal interrupt processing is performed to process the interrupt based on a normal processing procedure. If the sensitive-data is accessed, the access is determined and whether to allow the data to be accessed is determined based on a determining result. If the access is suspected to be abnormal, the access is restricted and an alarm is generated.

During running of the system, the real-time updating program monitors the event of the OS in real time. When the OS allocates new sensitive-data or releases old sensitive-data, the real-time update handler also updates values of control flag bits of the sensitive-data list and the page table entry accordingly.

In an example implementation case, information about an event of a new OS may be monitored in real time by registering a callback notification program and using a hook, for example, starting or terminating a new process, loading or unloading a new dynamically loadable kernel module (LKM), and creating or closing a new file or directory, to further determine how to make a change to the sensitive-data list.

The malware may deliberately delete the callback notification program and cancel registration of the callback. In this manner, attackers may bypass the technical solutions provided in embodiments of this application. In order to avoid such attacks, a self-protection watchdog mechanism is provided to protect against such attacks.

The watchdog is intended to prevent attackers from stopping and/or disabling the technical solutions provided in embodiments of this application, and prevent some components from being tampered with. Details have been mentioned above and are not described herein. A cycle is set for the watchdog to monitor these components against being tampered with.

Figure 8:
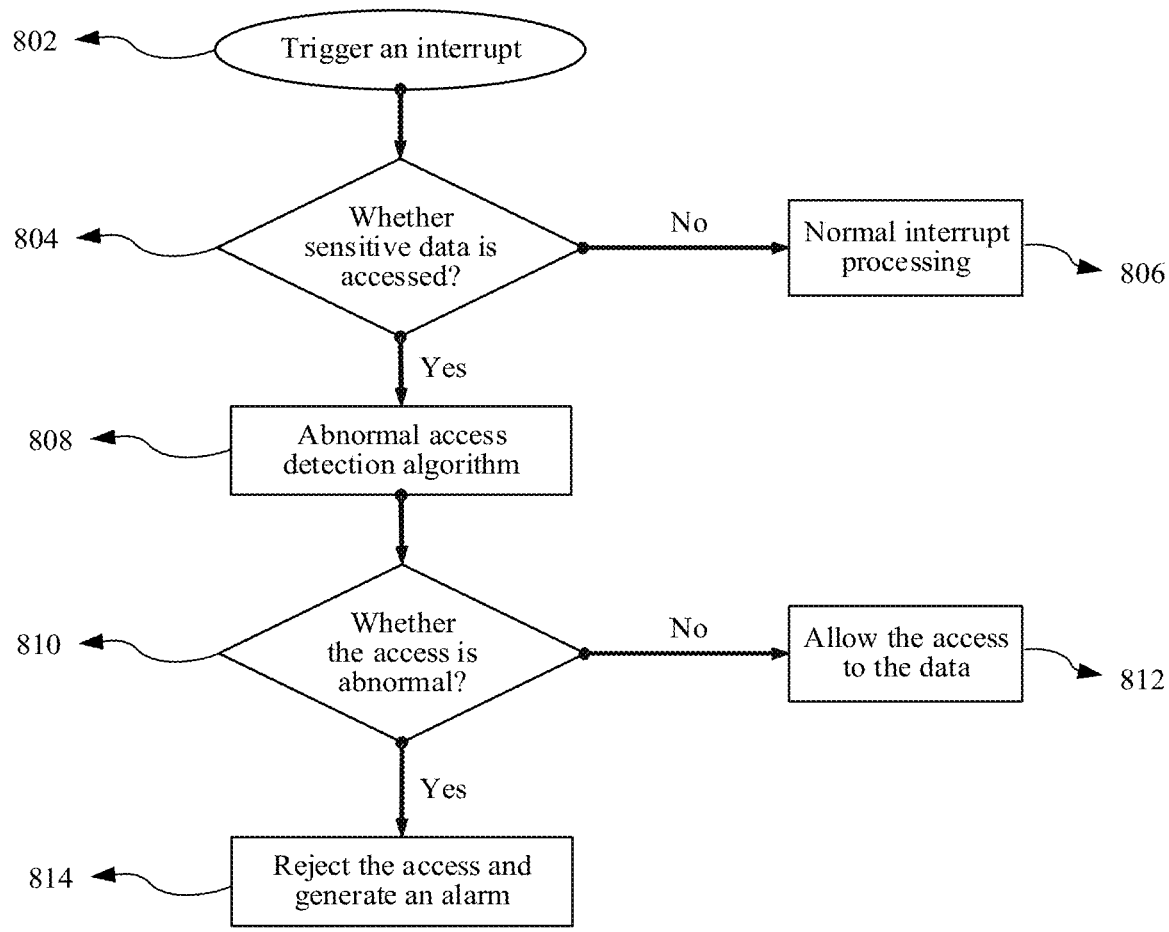
FIG. 8 is a schematic flowchart of an interrupt processing scheme according to an embodiment of this application.

A page fault interrupt is used as an example. The following describes in detail interrupt processing procedures in this embodiment of this application, as shown in FIG. 8.

Procedure 802: Trigger an interrupt after a page table entry of sensitive-data is accessed.

Procedure 804: Determine whether the interrupt is generated because of access to sensitive-data or access to insensitive-data.

If only the insensitive-data is accessed, and the page fault interrupt is triggered because the insensitive-data is not in a memory page, go to procedure 806. If the sensitive-data is accessed, go to procedure 808.

Procedure 806: Normally process the page fault interrupt, for example, search a hard disk for insensitive-data to be accessed.

Procedure 808: The interrupt points to an interrupt handler, and the interrupt handler determines, based on an abnormal access detection algorithm, whether the access to the sensitive-data is abnormal.

Procedure 810: Determine whether the access to the sensitive-data is normal or abnormal. If the access is normal, go to procedure 812. If the access is abnormal, go to procedure 814.

Procedure 812: When the access to the sensitive-data is normal, allow the access to the sensitive-data.

Procedure 814: When the access to the sensitive-data is abnormal, restrict the access to the sensitive-data and generate an alarm.

Compared with a conventional technology in which a delay in detection time is caused by periodically performing integrity check on kernel code, the access to the sensitive-data can be detected in real time in this embodiment of this application, thereby achieving real-time performance. In addition, a watchdog self-protection technical solution is provided. The technical solution can prevent some components from being stopped, disabled, or tampered with, and can hide the watchdog itself from attackers.

The self-protection watchdog mechanism is critical to provide long-term reliable abnormal detection, especially an advanced persistent threat (APT) abnormal detection.

The technical solutions provided in embodiments of this application may not require any hardware extension, for example, a hardware virtualization technology, and may even be implemented for a lightweight OS. Compared with many virtualized hardware-based monitoring technologies in the industry, this application is more flexible. Alternatively, the hardware extension is performed, for example, a newly defined flag bit of a page table entry is added, to enhance security and improve protection efficiency.

Figure 9A:
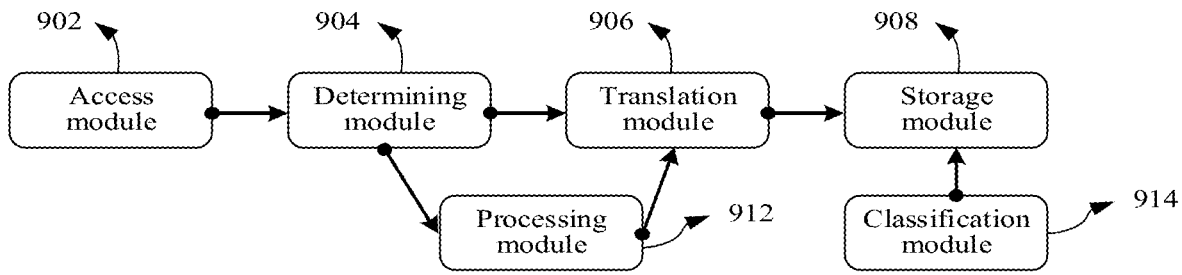
FIG. 9A is a diagram of a structure of a data protection apparatus according to an embodiment of this application.

FIG. 9A is a diagram of a structure of a feasible apparatus according to an embodiment of this application. The apparatus includes an access module 902, a determining module 904, a translation module 906, a storage module 908, a processing module 912, and a classification module 914. A user requests, by using the access module 902, to access data in the storage module 908. The determining module 904 determines the access to determine whether data to be accessed is the data that needs to be protected. If the data is not the data that needs to be protected, directly go to the translation module 906. If the data is the data that needs to be protected, go to the processing module 912. The processing module 912 determines whether the access is abnormal. If the access is abnormal, the access is restricted, and an alarm is reported to the user for indicating that there is an abnormal access. If the access is normal, the access is allowed, and the translation module 906 is jumped to. The translation module 906 translates a virtual address into a physical address. Based on the physical address, the access module 902 finally accesses the data that needs to be protected and that is stored in the storage module 908. It should be noted that translation operations mentioned in this application may have other names, such as mapping, which express a same meaning. In addition, the classification module 914 distinguishes between the data that needs to be protected and data that does not need to be protected in the storage module, so that only the data that needs to be protected or the data that does not need to be protected is in a same storage block. The storage block may be a memory page or in another form that represents a storage area range. The data that needs to be protected includes sensitive-data and other data that needs to be protected. The data that does not need to be protected includes insensitive-data and other data that does not need to be protected.

Figure 9B:
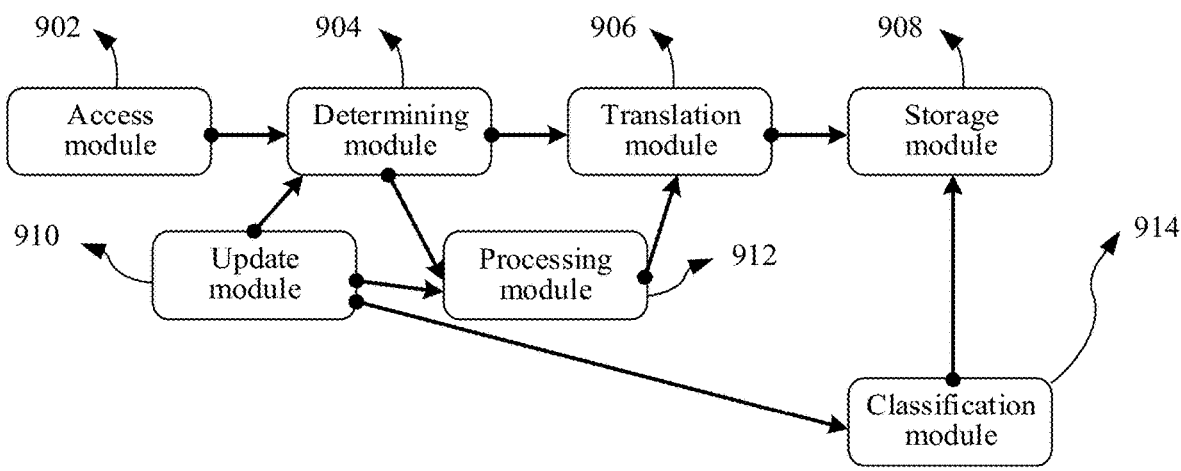
FIG. 9B is a diagram of a structure of another data protection apparatus according to an embodiment of this application.

FIG. 9B is a diagram of a structure of a feasible apparatus according to another embodiment of this application. Compared with the apparatus shown in FIG. 9A, an updating module 910 is newly added. The updating module 910 updates the determining module 904, the processing module 912, and the classification module 914 via a real-time event of an OS, such as creating and/or removing a memory space area, loading and/or unloading a piece of kernel code, or a latest attack manner and a data type of a latest attack included in a system patch update, to ensure that the entire apparatus can effectively intercept an abnormal access.

Figure 9C:
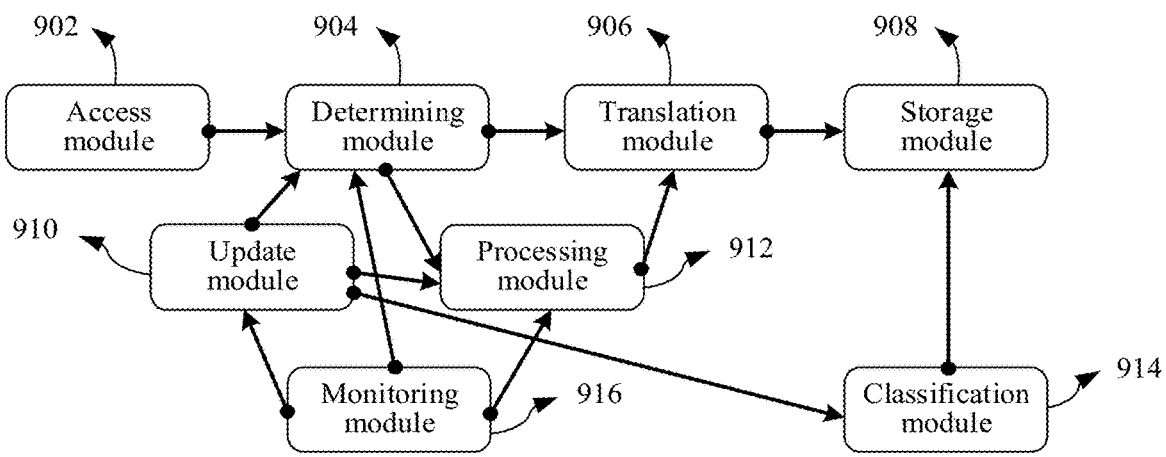
FIG. 9C is a diagram of a structure of another data protection apparatus according to an embodiment of this application.

FIG. 9C is a diagram of a structure of a feasible apparatus according to another embodiment of this application. Compared with the apparatus shown in FIG. 9B, a monitoring module 916 is newly added. The monitoring module 916 is configured to monitor a case in which any one or more of the determining module 904, the updating module 910, and the processing module 912 are bypassed or tampered with by a malicious access. If the monitoring module 916 finds that any module has been bypassed or tampered with, an alarm is generated.

In a feasible embodiment of this application, a page table 606 in FIG. 6 may implement functions of the determining module 904 and the translation module 906 in FIG. 9C. The interrupt descriptor table 618, the interrupt handler 620, and the sensitive-data list 628 in FIG. 6 may implement a function of the processing module 912 in FIG. 9C. The real-time updating program 626 in FIG. 6 may implement a function of the updating module 910 in FIG. 9C. The watchdog 630 in FIG. 6 may implement a function of the monitoring module 916 in FIG. 9C. The memory space in FIG. 6 may implement a function of the storage module 908 in FIG. 9C. A function of the classification module 914 in FIG. 9C is performed by the OS. Correspondingly, each module in FIG. 9C may implement functions of each component in FIG. 6. It is easily understood that the updating module 910 updates the determining module 904, the processing module 912, and the classification module 914, that is, updates corresponding components in FIG. 6.

Figure 10:
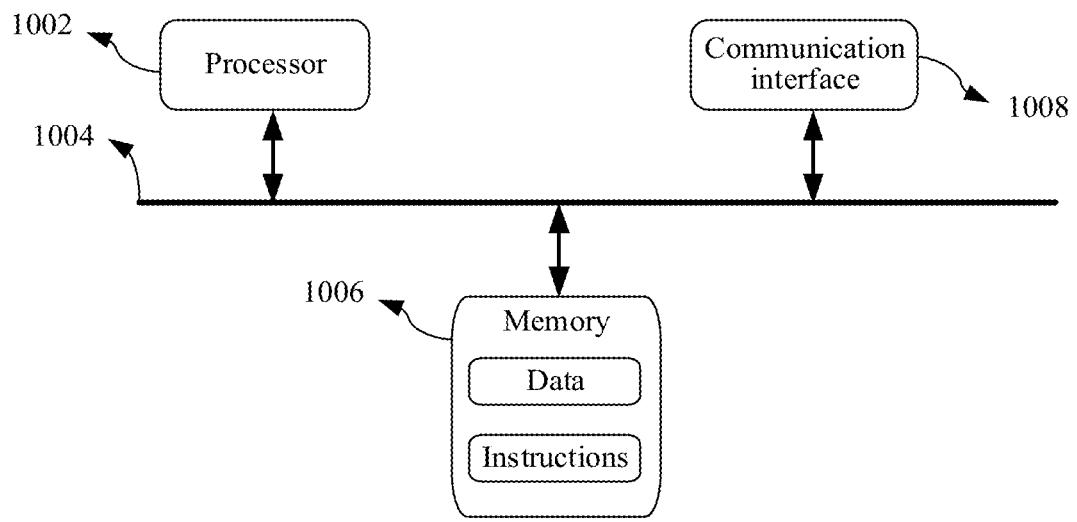
FIG. 10 is a diagram of a structure of a computer device according to an embodiment of this application.

This application further provides a computer device shown in FIG. 10. The computer device includes a processor 1002, a memory 1006, a communication interface 1008, and a communication bus 1004. The processor 1002 reads a group of computer instructions from the memory 1006 to perform the foregoing data protection method.

The access module, the determining module, the translation module, the storage module, the updating module, the processing module, the classification module, and the monitoring module described in embodiments of this application may execute the computer instructions by using the computer device shown in FIG. 10, to implement described functions of each module.

An embodiment of this application provides a computer storage medium. The computer storage medium stores a computer program. When the computer program is executed by a processor, all or some of steps of the foregoing data protection method are implemented.

An embodiment of this application provides a computer program product including instructions. When the computer program product runs on a computer, the computer is enabled to perform all or some of steps of the foregoing data protection method.

It should be explained that in embodiments of this application, the sensitive-data is only one type of the data that needs to be protected, and the insensitive-data is only one type of the data that does not need to be protected. This application does not limit types of the data that needs to be protected and the data that does not need to be protected. Other implementations related to types of the data that needs to be protected and the data that does not need to be protected also fall within the protection scope of this application.

It should be understood that functional modules in embodiments of this application may be integrated into one module, or each module may exist as a separate functional module, or two or more modules are integrated into one module. The integrated module may be implemented in a form of hardware, or may be implemented in a form of software, or may be implemented in a form of hardware in addition to a software functional module.

The foregoing computer instructions of a module implemented in a form of a software function module may be stored in a computer-readable storage medium. The software functional module is stored in a storage medium, and includes several instructions for instructing a computer device (which may be a personal computer, a server, or a network device) to perform some of steps of the methods described in embodiments of this application. The foregoing storage medium may be a readable non-volatile storage medium, including any medium capable of storing program code, such as a removable hard disk, a read-only memory (ROM), a random-access memory (RAM), a magnetic disk, or a compact disc.

Finally, it should be noted that the foregoing embodiments are being used to describe the technical solutions of this application, but not to limit the technical solutions. Although this application is described in detail with reference to the foregoing embodiments, a person of ordinary skill in the art should understand that they may still make modifications to the technical solutions recorded in the foregoing embodiments, or make equivalent replacements to some technical features thereof. However, these modifications or replacements do not make corresponding technical solutions depart from the protection scope of claims.

What is claimed is:

1. A data protection method, comprising:
determining first data that needs to be protected based on at least one of a type or a function of existing attacked data;
prohibiting direct access to the first data;
triggering an interrupt when there is access to the first data;
determining, during the interrupt, whether the access is abnormal;
restricting the access when the access is abnormal;
determining a frequency for accessing the first data; and
canceling protection for the first data when the frequency is greater than or equal to a threshold.

2. The data protection method of claim 1, wherein determining whether the access is abnormal comprises checking whether at least one of a source of the access is abnormal or a destination of the access is abnormal.

3. The data protection method of claim 1, further comprising separating a first storage block of the first data from a second storage block of second data that does not need to be protected such that only the first data exists in at least one storage block or only the second data exists in the at least one storage block.

4. The data protection method of claim 3, further comprising:
setting a flag bit for a page table entry of a storage block of each piece of data for indicating whether the storage block corresponds to the first data; and
updating a list of the first data.

5. The data protection method of claim 4, wherein the updating comprises updating the list based on a real-time event of an operating system.

6. The data protection method of claim 4, wherein determining whether the access is abnormal further comprises determining, from an interrupt descriptor table based on the interrupt, an interrupt handler to be run.

7. The data protection method of claim 6, further comprising setting a watchdog to prevent a status of one or more of the list, the interrupt descriptor table, or the flag bit from being tampered.

8. A data protection apparatus, comprising:
a memory configured to store executable instructions; and
a processor coupled to the memory and configured to execute the executable instructions to cause the data protection apparatus to:
determine, from data stored in a storage module, first data that needs to be protected based on at least one of a type or a function of existing attacked data;
prohibit direct access to the first data;
trigger an interrupt when there is access to the first data;
determine, during the interrupt, whether access is abnormal;
restrict the access when the access is abnormal;
determine a frequency for accessing the first data; and
cancel protection for the first data when the frequency is greater than or equal to a threshold.

9. The data protection apparatus of claim 8, wherein the processor is further configured to execute the executable instructions to cause the data protection apparatus to check whether at least one of a source of the access is abnormal or a destination of the access is abnormal.

10. The data protection apparatus of claim 8, wherein the processor is further configured to execute the executable instructions to cause the data protection apparatus to separate a first area configured for storing the first data from a second area configured for storing second data that does not need to be protected such that only the first data exists in at least one storage block or only the second data exists in the at least one storage block.

11. The data protection apparatus of claim 10, wherein the processor is further configured to execute the executable instructions to cause the data protection apparatus to set a flag bit for a page table entry in a storage block of each piece of data to indicate whether the storage block corresponds to the first data.

12. The data protection apparatus of claim 11, wherein the processor is further configured to execute the executable instructions to cause the data protection apparatus to update a list of the first data.

13. The data protection apparatus of claim 12, wherein the processor is further configured to execute the executable instructions to cause the data protection apparatus to update the list based on a real-time event of an operating system.

14. The data protection apparatus of claim 12, wherein the processor is further configured to execute the executable instructions to cause the data protection apparatus to determine whether the access is abnormal by determining, from an interrupt descriptor table based on the interrupt, an interrupt handler to be run.

15. The data protection apparatus of claim 14, wherein the processor is further configured to execute the executable instructions to cause the data protection apparatus to prevent a status of one or more of the list, the interrupt descriptor table, or the flag bit from being tampered.

16. A computer program product comprising computer-executable instructions stored on a non-transitory computer-readable storage medium that when executed by a processor, cause a data protection apparatus to:
determine first data that needs to be protected based on at least one of a type or a function of existing attacked data;
prohibit direct access to the first data;
trigger an interrupt when there is access to the first data;
determine, during the interrupt, whether the access is abnormal;

restrict the access when the access is abnormal;
    determine a frequency for accessing the first data; and
    cancel protection for the first data when the frequency is greater than or equal to a threshold.

17. The computer program product of claim 16, wherein the computer-executable instructions stored on a non-transitory computer-readable storage medium that when executed by a processor, further cause the data protection apparatus to check whether at least one of a source of the access is abnormal or a destination of the access is abnormal.

18. The computer program product of claim 16, wherein the computer-executable instructions stored on a non-transitory computer-readable storage medium that when executed by a processor, further cause the data protection apparatus to separate a first area configured for storing the first data from a second area configured for storing second data that does not need to be protected such that only the first data exists in at least one storage block or only the second data exists in the at least one storage block.

19. The computer program product of claim 18, wherein the computer-executable instructions stored on a non-transitory computer-readable storage medium that when executed by a processor, further cause the data protection apparatus to set a flag bit for a page table entry in a storage block of each piece of data to indicate whether the storage block corresponds to the first data.

20. The computer program product of claim 19, wherein the computer-executable instructions stored on a non-transitory computer-readable storage medium that when executed by a processor, further cause the data protection apparatus to update a list of the first data.

* * * * *